United States Patent
Ohishi

(10) Patent No.: US 7,089,664 B2
(45) Date of Patent: Aug. 15, 2006

(54) VARIABLE BLADE MANUFACTURING METHOD AND VARIABLE BLADE IN VGS TYPE TURBO CHARGER

(75) Inventor: Shinjiroh Ohishi, Shimada (JP)

(73) Assignee: Akita Fine Blanking Co., Ltd., Shizuoka (JP)

(*) Notice: Subject to any disclaimer, the term of this patent is extended or adjusted under 35 U.S.C. 154(b) by 0 days.

(21) Appl. No.: 10/485,645

(22) PCT Filed: Aug. 2, 2002

(86) PCT No.: PCT/JP02/07942

§ 371 (c)(1),
(2), (4) Date: Jul. 6, 2004

(87) PCT Pub. No.: WO03/014548

PCT Pub. Date: Feb. 20, 2003

(65) Prior Publication Data

US 2004/0237521 A1    Dec. 2, 2004

(30) Foreign Application Priority Data

| Aug. 3, 2001 | (JP) | ............................. 2001-235667 |
| Aug. 3, 2001 | (JP) | ............................. 2001-235669 |
| Sep. 3, 2001 | (JP) | ............................. 2001-235720 |

(51) Int. Cl.
*B21D 53/78* (2006.01)
*B12P 15/02* (2006.01)

(52) U.S. Cl. ........................................ 29/889.7; 29/557

(58) Field of Classification Search ........ 415/159–160, 415/163–165; 29/889.7, 557, 34 R
See application file for complete search history.

(56) References Cited

U.S. PATENT DOCUMENTS

| 5,403,161 A * | 4/1995 | Nealon et al. ............... 416/226 |
| 6,050,775 A * | 4/2000 | Erdmann et al. ............ 415/164 |
| 6,453,556 B1 * | 9/2002 | Watanabe et al. .......... 29/889.7 |

FOREIGN PATENT DOCUMENTS

| JP | 5-123808 | 5/1993 |
| JP | 11-151542 | 6/1999 |
| JP | 2000-301283 | 10/2000 |

* cited by examiner

*Primary Examiner*—Edward K. Look
*Assistant Examiner*—Devin Hanan
(74) *Attorney, Agent, or Firm*—Wenderoth, Lind & Ponack, L.L.P.

(57) ABSTRACT

A manufacturing method based on a plastic working technique which can eliminate cutting and welding as much as possible in manufacturing an adjustable blade incorporated in a VGS turbocharger. In the method a blank is punched out from a metal material having a substantially constant thickness to be a shaped material (W) as a starting form for an adjustable blade (1); thereafter, the shaped material (W) is compressed between a pair of opposed dies to form a blade portion (11), a shaft portion (12) and the like having desired shapes; thereafter a non-product portion protruding from a product portion is trimmed; then the shaft portion (12) is rolled by pressing the shaft portion (12) of the shaped material (W) against a pair of dies to have a desired diametrical thickness and a near net shape having a shape and dimensions thereof made close to the aimed at adjustable blade. In a finishing operation the shaped material (W), having the near net shape, is pressed by a pair of opposed dies, so that a desired accuracy of a vane height in a completed state can be achieved.

14 Claims, 6 Drawing Sheets

VARIABLE BLADE MANUFACTURING METHOD AND VARIABLE BLADE IN VGS TYPE TURBO CHARGER

BACKGROUND OF THE INVENTION

1. Technical Field

The present invention relates to a VGS turbocharger used in an engine for a motor vehicle or the like, and more particularly to a novel manufacturing method which can eliminate a cutting operation and a welding operation as much as possible, at the time of manufacturing an adjustable blade to be incorporated in the turbocharger.

2. Description of Related Art

A turbocharger is known as a supercharger used as means for improving the power output and the performance of an automobile engine. The turbocharger is an apparatus in which a turbine is driven by the exhaust energy of the engine to rotate a compressor with the power of the turbine, whereby the engine is supercharged to have more air fed into it than fed into it by natural suction. In the case of an engine capable of running at up to a high rotational speed region, when the engine is running at low rotational speeds, the exhaust turbine of the turbocharger hardly functions due to the reduced flow rate of the exhaust gas, so that the engine can not avoid giving a slow-moving feeling until the exhaust turbine runs efficiently, and necessitating a subsequent time or a so-called turbo-lag before the turbine rapidly reaches the full-running state. Furthermore, in the case of a diesel engine which runs inherently at low rotational speeds, there is a disadvantage in that it is difficult to produce an effect of the turbocharger.

Therefore, a VGS turbocharger that works efficiently even when the engine is running at low rotational speeds has been developed. The turbocharger of this type is adapted to obtain a high power output when the engine is running at low rotational speeds by throttling flow of exhaust gas at a low flow rate with a plurality of adjustable blades (vanes) disposed on an outer periphery of the exhaust turbine to increase the velocity of the exhaust gas and increase work of an exhaust turbine. For this reason, in the VGS turbocharger, an adjusting mechanism for the adjustable blades is required additionally, and it is required that the associated constituting parts be formed to have a complicated shape or the like in comparison with those of the conventional one.

It has been common that, when an adjustable blade for such a VGS turbocharger is manufactured, a metal material (or a shaped material having a starting form for the adjustable blade) including a blade portion and a shaft portion that are integrally formed is first formed, for example, in accordance with a precision casting method represented by a lost wax casting method, a metal injection molding method or the like, and the shaped material is then suitably subjected to cutting or the like, to thereby finish the blade portion and the shaft portion to have desired shapes and dimensions.

However, in the technique using cutting operations applied to the shaped material, the following problems arise. Since this kind of turbo apparatus is constructed so as to introduce exhaust gas and utilize energy of the exhaust gas, a surface member thereof is naturally exposed to a high-temperature atmosphere of the exhaust gas. Since the exhaust gas contains constituents that can corrode the metal material, a heat resisting stainless steel such as SUS310S having excellent heat, oxidation resistance and the like is also used for the adjustable blade. However, since such a material is generally difficult to cut and therefore requires a lot of time to cut it, there is a problem that a lot of trouble is taken for processing it. In addition, since about ten to fifteen adjustable blades are required in one turbocharger, it is necessary to manufacture 300,000 to 450,000 adjustable blades a month in the case that about 30,000 motor vehicles are actually mass-produced monthly, so that the cutting operation is incapable of coping with this (production of about 500 adjustable blades is a limit in the cutting operation).

In view of the foregoing, there has been developed a method of manufacturing an adjustable blade from which the cutting operation is excluded, and the method is disclosed, for example, in Japanese Patent Application Publication No. 2000-145470 "Adjustable vane applied to adjustable vane type turbocharger and manufacturing method of the same". In this Japanese Patent Application Publication No. 2000-145470, there is disclosed a method of manufacturing an adjustable blade, in which a blade portion and a shaft portion are separately formed, followed by welding them. A reasonable evaluation is obtained by this method in view of the fact that no cutting operation is required, however, there leaves room for further development.

In other words, in the method of manufacturing the adjustable blade by welding the previously separately formed blade portion and shaft portion, it is extremely difficult to weld the blade portion and the shaft portion while keeping a fixed angle and to accurately achieve a height of the vane corresponding to a width of the blade in a stable state, and thus variations are generated. Further, the shapes of the blade portion and the shaft portion in the respective single part states can be achieved accurately, however, the desired dimensional accuracy can not be obtained in the final product due to an adverse effect applied by a welding heat and a welding trail (a welding bead). Accordingly, there has not been achieved a stage that the adjustable blade can be mass produced at a stable and high quality level. Originally, as the adjustable blade is constructed such as to rotate around the shaft portion so as to throttle the exhaust gas by the blade portion, the height of the blade, the mounting angle of the blade portion and the shaft portion and the like are important dimensional values greatly relating to the performance of the turbocharger itself, and a high degree of accuracy is strongly required.

Additionally, recent years have seen tighter regulation of exhaust gas emission into the atmosphere particularly from diesel vehicles from a viewpoint of environmental protection and the like. For a diesel engine which inherently runs at low rotational speeds, mass production of a VGS turbocharger capable of improving the engine efficiency from a low rotational speed region has been strongly desired in order to reduce NOx, particulate matter (PM) and the like.

SUMMARY OF THE INVENTION

A method of manufacturing an adjustable blade for a VGS turbocharger, wherein the adjustable blade includes a shaft portion serving as a center of rotation and a blade portion for substantially adjusting the flow rate of exhaust gas. The adjustable blade is incorporated in the VGS turbocharger, and the exhaust gas that is discharged from an engine at a relatively low flow rate is suitably throttled to increase the velocity of the exhaust gas so that an exhaust turbine wheel is rotated by the energy of the exhaust gas and a compressor directly coupled to the exhaust turbine wheel feeds more air into the engine than is fed into it by natural suction. Thus, a high output power of the engine is obtained at low rotational speeds. The method of manufacturing the adjustable blade comprises: a shaped material preparing step of forming a blank which is punched out from a metal material having a substantially constant thickness so as to have a volume capable of achieving the aimed at adjustable blade and which is a shaped material as a starting form for the adjustable blade; a forming step of compressing the shaped material between a pair of opposed dies so as to form the blade portion, the shaft portion and the like which have desired shapes; a trimming step of trimming a non-product portion of the shaped material protruding from a product portion in the forming step; a rolling step of pressing the shaft portion of the shaped material substantially including only the product portion against a pair of dies after finishing the trimming so as to have a desired diametrical thickness; and a barreling step of surface polishing collectively the shaft portion, the blade portion and the like of the shaped material.

In accordance with the invention, it is possible to eliminate the cutting operation and the welding operation from the manufacturing step of the adjustable blade as much as possible, so that mass production of the adjustable blade can be actually achieved.

Further, in the shaped material preparing step of the method of manufacturing an adjustable blade for a VGS turbocharger, the blank is punched out by fine blanking, and in the forming step, the shaped material is formed to have a desired shape by a cold press forging machine.

In accordance with the invention, since the shaped material is blanked or punched out by a fine blanking apparatus, it is possible to perform punching with a high degree of accuracy, so that the shaped material which is extremely improved in a surface accuracy of a shear plane and a dimensional accuracy thereof can be obtained. Further, since the punched shaped material is formed into the desired shape by the cold press forging machine, it is possible to smoothly transition to the forming step from the punching step, and it is possible to efficiently perform processing well within the capacity.

Further, in the forming step of the method of manufacturing an adjustable blade for a VGS turbocharger, processing is performed in a state where one or both of the shaped material and the opposed dies are heated to 50 to 300° C.

In accordance with the invention, since the shaped material and the opposed dies are heated to a warm condition in the forming step, the metal material tends to flow, and it is possible to improve the forming property in this step and the rolling property in the later step. Accordingly, it is possible to effectively inhibit a shaft elongation (a phenomenon that the shaft portion is elongated in an axial direction) and a sharp edge (a sharp portion formed to protrude from a distal end of the shaft portion in accordance that the metal material on the surface of the shaft portion generates a plastic flow by rolling the shaft portion) which are caused by the rolling from being generated. Accordingly, it is possible to eliminate the cutting operation which is frequently performed for correcting the shaft elongation and the sharp edge, and further it is possible to eliminate more cutting operation from all the steps of manufacturing the adjustable blade, whereby mass production of the adjustable blade can be actually achieved.

Further, in the method of manufacturing an adjustable blade for a VGS turbocharger, an austenitic heat resisting material is applied to the shaped material, and the greater $Md_{30}$ corresponding to a strain induced martensitic transformation index of the shaped material is, the higher a temperature to which the shaped material or the opposed dies is heated in the forming step is set.

In accordance with the invention, it is possible to determine an optimum heating temperature from the $Md_{30}$ value of the kind of the used material, so that a deformation margin level of the shaped material W can be enhanced, resulting in an accurate processing being performed.

Further, in the method of manufacturing an adjustable blade for a VGS turbocharger, the shaped material preparing step is performed by fine blanking under a room temperature atmosphere, and rounding or chamfering is applied to corner portions of the punched blank so as to easily form the blade portion and the shaft portion in the forming step.

In accordance with the invention, since the shaped material is punched out under the room temperature atmosphere in the preparing step of the shaped material and the heating is not particularly required, it is possible to reduce the cost required in this step. Further, since the rounding (fillet processing) or the chamfering is applied to corner portions in the punched shaped material (the blank) as necessary, it is easy to perform the forming of the blade portion, the shaft portion and the like. In other words, in the forming step, since the shaped material is deformed in such a manner that the raw material is partly flowed from the non-required portion to the required portion as it were without increasing and decreasing the volume of the raw material itself, it is possible to facilitate the flow of the raw material by forming the pounded corners or the like in the corner portions in the part to be flowed, to thereby accurately achieve the desired shape. Of course, rounding or chamfering of the corners can reduce the load applied to the shaped material and the die in the forming step, and can contribute to simplify the forming step per se.

Further, in the method of manufacturing an adjustable blade for a VGS turbocharger, the adjustable blade includes a shaft portion serving as a center of rotation and a blade portion for substantially adjusting the flow rate of exhaust gas, the adjustable blade being incorporated in the VGS turbocharger, and wherein the exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, whereby a high output power of the engine is obtained at low rotational speeds, is characterized in that: in manufacturing the adjustable blade, the adjustable blade is integrally provided with the blade portion and the shaft portion and a starting material thereof is a metal shaped material as a starting form for the adjustable blade; the shaped material is made to have such a near net shape by applying a suitable processing to the shaped material or the shaped material is originally formed to have such a near net shape in a stage of obtaining the shaped material that the shape and dimensions thereof are made close to those of the aimed at adjustable blade; and in finishing a vane height corresponding to a blade width of the adjustable blade, the shaped material having the near net shape is pressed between a pair of opposed dies, whereby an accuracy of the vane height in a finished state is achieved.

In accordance with the invention, since the shaped material formed to have a near net shape is pressed, and the vane height of the blade portion is processed with the desired accuracy, it is possible to make the finishing step efficient without the cutting operation requiring a lot of trouble. Further, such construction can eliminate more cutting operation from the manufacturing step of the adjustable blade, so that a mass production system for the adjustable blade can be more particularly achieved.

Further, in the method of manufacturing an adjustable blade for a VGS turbocharger, the pair of opposed dies for finishing the vane height of the adjustable blade includes a holding die for holding the shaped material and a pressing die for relatively moving in close to and apart from the holding die; a shaft portion receiving portion is formed in the holding die, and a blade portion receiving portion is formed in another the pressing die; and at the time of pressing, the blade portion of the shaped material is compressed between the holding die and the pressing die, so that the vane height is finished with a desired accuracy.

In accordance with the invention, since the vane height is finished with the desired accuracy by compressing the blade portion by the holding die in which the shaft portion receiving portion is formed, and the pressing die in which the blade portion receiving portion is formed, it is possible to approximately completely solve the trouble that the blade portion, the shaft portion and the like are accidentally bent at the time of pressing, to thereby more actually achieve the press finishing with a high accuracy.

Further, in the method of manufacturing an adjustable blade for a VGS turbocharger, the adjustable blade is provided at a distal end of the shaft portion thereof with a reference surface formed in an appropriate inclined state with respect to the blade portion thereof; the opposed dies are provided with a cam die for receiving the reference surface and positioning the shaped material; and press finishing of the vane height is performed while the adjustable blade is restricted to an appropriate attitude by the cam die.

In accordance with the invention, since the cam die restricts the adjustable blade to the approximately fixed attitude at the time of press finishing, it is possible to accurately achieve a mounting angle between the shaft portion and the blade portion, that is, the inclined state between the reference surface and the blade portion. In this case, the finishing press of the shaped material (the adjustable blade) is performed in the positioned state in which the shaft portion (the reference surface) is held by the cam die, and there can be expected a reforming effect of somewhat correcting the mounting state between the shaft portion and the blade portion (in this case, based on the shaft portion).

Further, in the method of manufacturing an adjustable blade for a VGS turbocharger, wherein the adjustable blade includes a shaft portion serving as a center of rotation and a blade portion for substantially adjusting the flow rate of exhaust gas, the adjustable blade being incorporated in the VGS turbocharger, wherein the exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, whereby a high output power of the engine is obtained at low rotational speeds. The method of manufacturing the adjustable blade comprises the steps of: at the time of obtaining a shaped material as a starting form for the adjustable blade, using a blank punched out from a metal material having a substantially constant thickness as the shaped material; thereafter, compressing the shaped material between a pair of opposed dies so as to form the blade portion, the shaft portion and the like to have desired shapes; then trimming a non-product portion of the shaped material protruding from a product portion; thereafter, pressing the shaft portion of the shaped material against a pair of dies so that the shaft portion is rolled to have a desired diametrical thickness and a near net shape having a shape and dimensions thereof which are made close to those of the aimed at adjustable blade; and for finishing a vane height corresponding to a blade width of the adjustable blade, pressing the shaped material having the near net shape between a pair of opposed dies so as to achieve an accuracy of the vane height in a completed state.

In accordance with the invention, since the processing can be performed mainly by the pressing apparatus at the time of manufacturing the adjustable blade, in particular, at the time of punching out the blank (the shaped material), finishing the vane height and the like, it is possible to eliminate the cutting operation requiring a lot of trouble and cost from the manufacturing step of the adjustable blade as much as possible, to thereby more particularly achieve the mass production of the adjustable blade.

Further, an adjustable blade for a VGS turbocharger comprises: a shaft portion serving as a center of rotation and a blade portion for substantially adjusting the flow rate of exhaust gas, the adjustable blade being incorporated in the VGS turbocharger, wherein the exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, whereby a high output power of the engine is obtained at low rotational speeds.

In accordance with the invention, it is possible to manufacture without performing the steps of cutting, welding and the like conventionally requiring a lot of time for processing, so that the adjustable blades as mass-produced products can be stably supplied to the market. In this connection, in the conventional method exclusively depending upon the cutting operation, about 500 products can be manufactured a day, however, in accordance with the present invention, for example, it is possible to mass produce about 15000 to 20000 products a day. Further, the mass-produced adjustable blade can be obtained as a precise adjustable blade having a high accuracy on the basis of engineering improvements, such as in punching out the metal shaped material, in a heating condition or the like suitably set in correspondence to the strain induced martensitic transformation index of the material kind in the forming step, in the rolling allowance for restricting the shaft elongation within an allowable range, and the like.

Further, an exhaust gas guide assembly in a VGS turbocharger comprises: adjustable blades for suitably controlling the flow rate of exhaust gas discharged from an engine to rotate an exhaust turbine wheel; a turbine frame which rotatably supports the adjustable blades at the outside of an outer periphery of the turbine wheel; and an adjusting mechanism for suitably rotating the adjustable blades to control the flow rate of the exhaust gas; wherein flow of the exhaust gas at a low flow rate is throttled by the adjustable blades to increase the velocity of the exhaust gas so that a high output power is obtained at low rotational speeds.

In accordance with the invention, it is possible to actually mass produce the exhaust gas guide assembly which has a high heat resistance and a high accuracy.

Further, the VGS turbocharger is so constructed that an exhaust turbine is driven by exhaust energy of an engine to rotate a compressor coupled to the exhaust turbine with the power of the exhaust turbine, whereby the engine is supercharged to have more air fed into it than is fed into it by natural suction; and the turbocharger is characterized in that: the turbocharger has an exhaust gas guide assembly, whereby flow of the exhaust gas at a relatively low flow rate is throttled to increase the velocity of the exhaust gas so that a high output power is obtained when the engine is running at low rotational speeds.

In accordance with the invention, it is possible to actually mass produce the VGS turbocharger having a high heat resistance. Further, since the adjustable blade having a high accuracy is incorporated in the turbocharger, it is possible to accurately and securely regulate the flow rate of the exhaust gas, and the turbocharger can sufficiently withstand the use in the high temperature exhaust gas atmosphere.

DETAILED DESCRIPTION OF THE INVENTION

Figure 1:
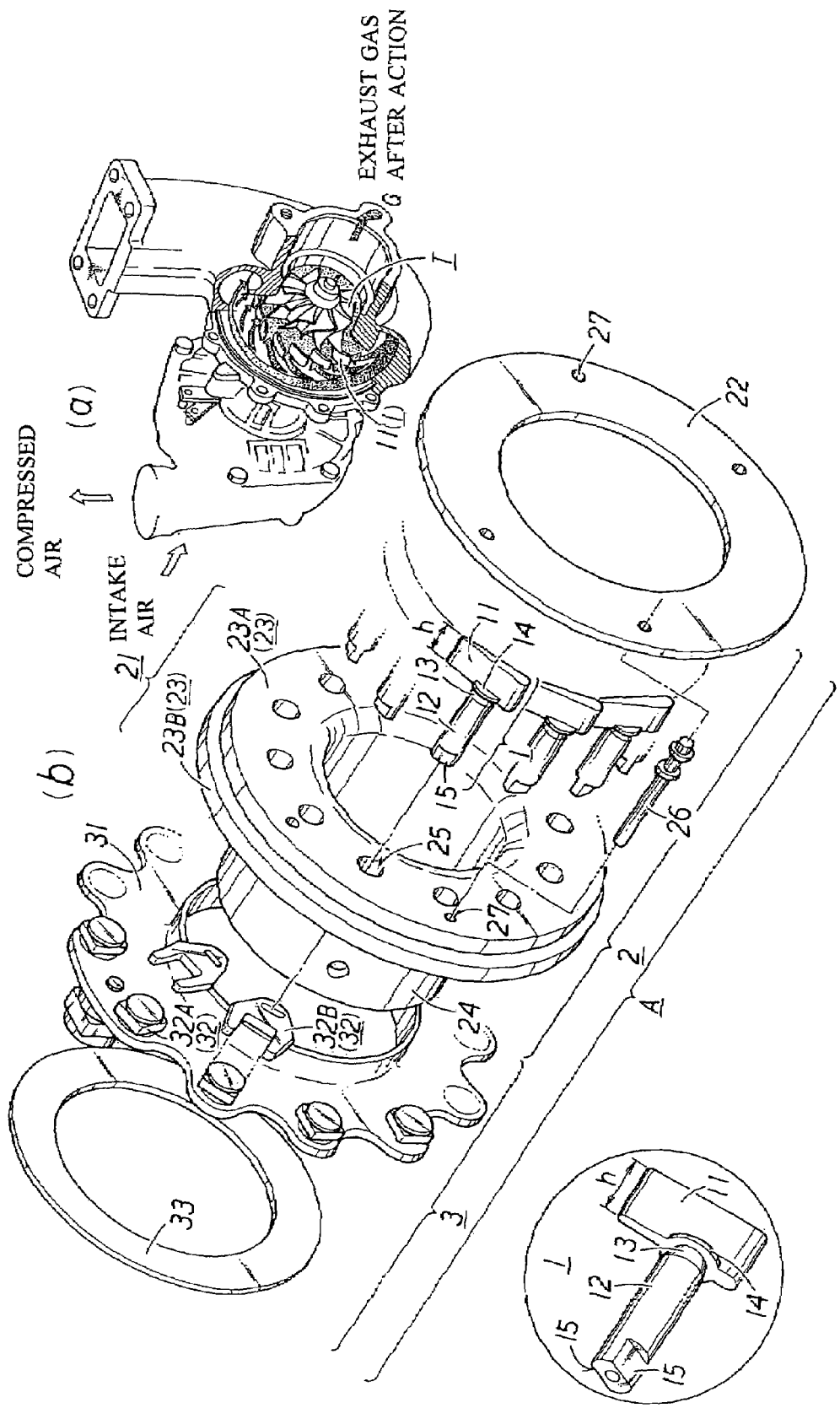
FIG. 1(a) is a perspective view showing a VGS turbocharger having an adjustable blade of the present invention incorporated therein.
FIG. 1(b) is an exploded perspective view showing an exhaust gas guide assembly.

The present invention will be described hereinbelow with reference to embodiments shown in the drawings. A description will be made of an adjustable blade 1 according to the present invention while a description will be given of an exhaust gas guide assembly A for a VGS turbocharger in which the adjustable blades 1 are used, followed by a description of a method of manufacturing the adjustable blade 1.

The exhaust gas guide assembly A suitably controls the flow rate of exhaust gas G by throttling the exhaust gas G as necessary while an engine is running at low rotational speeds. The exhaust gas guide assembly, as shown in FIG. 1 as an example, comprises a plurality of adjustable blades 1 for setting substantially the flow rate of the exhaust gas, provided at the outside of an outer periphery of an exhaust turbine wheel T, a turbine frame 2 for rotatably supporting the adjustable blades 1 and a blade adjusting mechanism 3 for rotating the adjustable blades 1 by a predetermined angle to set the flow rate of the exhaust gas G as necessary. Each component will be described.

First, the adjustable blade 1 will be described. As shown in FIG. 1 as an example, a plurality of adjustable blades 1 (approximately 10–15 blades for one unit of the exhaust gas guide assembly A) are arranged in an arc along the outer circumference of the exhaust turbine wheel T so that the adjustable blades 1 rotate respectively almost the same angle to suitably control the flow rate of the exhaust gas. Each adjustable blade 1 comprises a blade portion 11 and a shaft portion 12.

The blade portion 11 is formed to have a certain width corresponding mainly to a width of the exhaust turbine wheel T and an airfoil shape in cross-section in a width direction such that the exhaust gas G is effectively directed to the exhaust turbine wheel T. Hereinafter, the width dimension of the blade portion 11 is referred to as "blade height h".

The shaft portion 12 is formed to be continuous to and integrated with the shaft portion 12, so that the blade portion 11 serves as a rotation shaft for the blade portion 11 to be moved.

Figure 2:
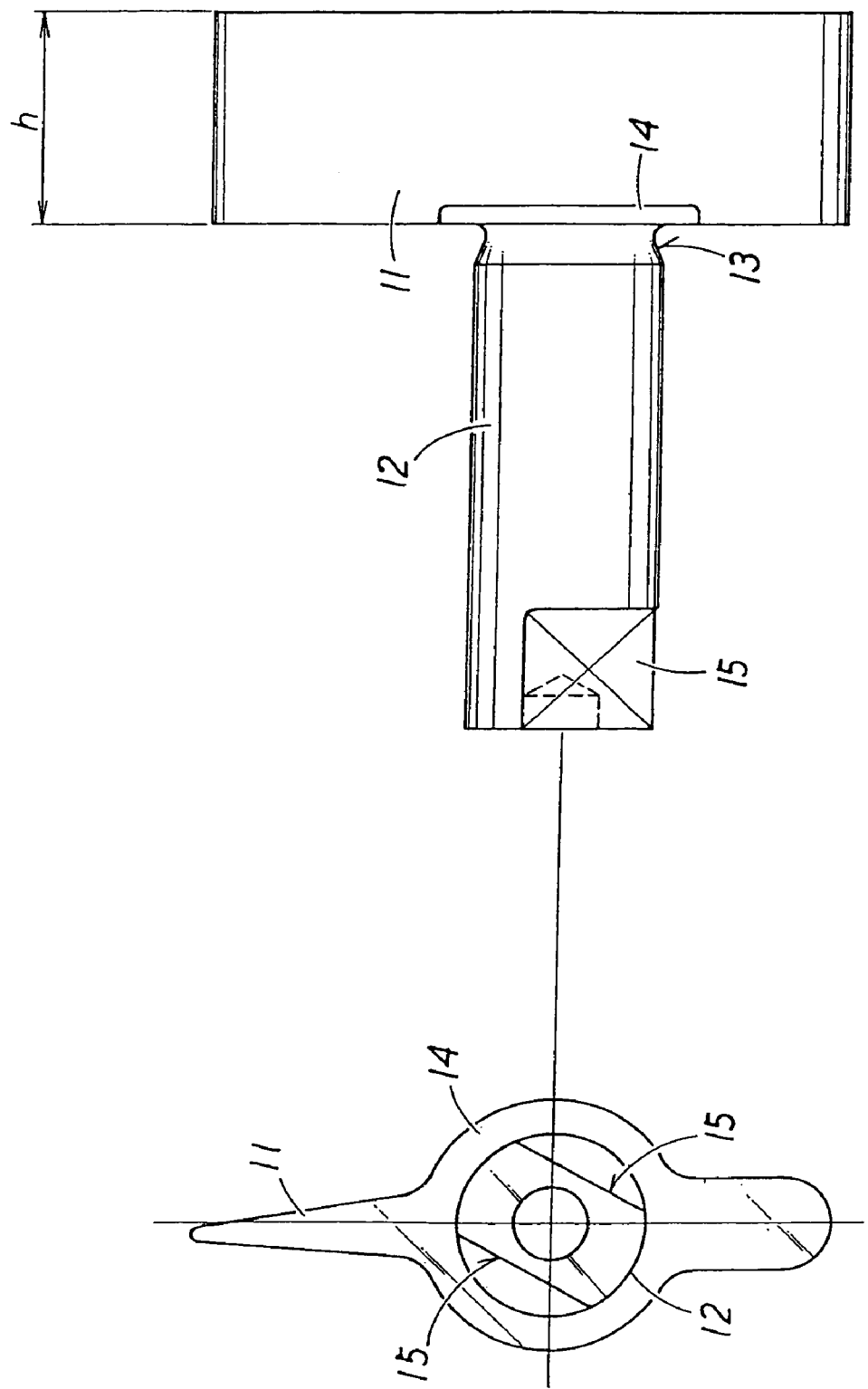
FIG. 2 is a front elevational view and a left side elevational view showing the adjustable blade of the present invention.

In a portion connecting the blade portion 11 and the shaft portion 12, a taper portion 13 tapering from the shaft portion 12 to the blade portion 11 and a flange portion 14 having a somewhat larger diameter than that of the shaft portion 12 are formed continuously. A bottom face of the flange portion 14 is formed to be almost flush with an end face of the blade portion 11 on the side of the shaft portion 12 of the adjustable blade 1, to thereby ensure a smooth rotation of the adjustable blade 1 through the bottom face serving as a sliding surface in a state where the adjustable blade 1 is fitted to the turbine frame 2. Furthermore, formed at a distal end of the shaft portion 12, reference planes 15 serve as a basis for mounting of the adjustable blade 1. These reference planes 15 are a portion fixed by caulking or the like to the blade adjusting mechanism 3. The reference planes 15, as shown in FIGS. 1 and 2 as an example, are formed by cutting out the shaft portion 12 on its opposite sides in a manner to have a substantially constant inclination with respect to the blade portion 11.

In this case, the adjustable blade 1 of the present invention is obtained as a complete product in such a manner that a metal material (hereinafter, refer to a shaped material W) integrally provided with the blade portion 11 and the shaft portion 12 in an incomplete state is first formed, and then the shaped material W is subjected to appropriate processing, to thereby attain an aimed at shape and dimensional accuracy. In this case, portions of the shaped material W in which the blade portion 11 and the shaft portion 12 are finally formed are defined respectively as a blade portion forming section 11a and a shaft portion forming section 12a.

Next, the turbine frame 2 will be described. The turbine frame 2 is constructed as a frame member for rotatably holding the plurality of adjustable blades 1. The turbine frame 2, as shown in FIG. 1 as an example, is constructed to sandwich the adjustable blades 1 by a frame segment 21 and a holding member 22 thereof. The frame segment 21 comprises a flange portion 23 for receiving the shaft portions 12 of the adjustable blades 1 and a boss portion 24 for being fitted therearound with the blade adjusting mechanism 3 described later. In such construction, the same number of receiving holes 25 as the number of the adjustable blades 1 are formed on a peripheral portion of the flange portion 23 and the holes are spaced regularly. The holding member 22 is formed so as to have a disk shape having an opening at the center thereof as shown in FIG. 1. In order to always rotate the blade portions 11 of the adjustable blades 1 sandwiched by the frame segment 21 and the holding member 22 smoothly, the dimension between the frame segment 21 and the holding member 22 is maintained at a substantially constant dimension (approximately the dimension of the blade width of the adjustable blade 1) and, as an example, the dimension is maintained by caulking pins 26 provided at four positions on the radially outer side of the receiving holes 25. Correspondingly, pin insertion holes 27 for receiving the respective caulking pins 26 are formed on the frame segment 21 and holding member 22.

In the illustrated embodiment, the flange portion 23 of the frame segment 21 comprises two flange parts, i.e. a flange part 23A having almost the same diameter as that of the holding member 22 and a flange part 23B having a somewhat larger diameter than that of the holding member 22. These flange parts are formed of a single member. However, in the case where it is too complicated to make the flange parts 23A and 23B by processing the same member, the flange parts 23A and 23B may be constructed in such a manner that two flange parts having different diameters are formed separately and then joined to each other by caulking, brazing or the like.

Next, the blade adjusting mechanism 3 will be described. The blade adjusting mechanism 3 is provided on the outer periphery of the boss portion 24 of the turbine frame 2 to rotate the adjustable blades 1 so as to control the flow rate of the exhaust gas. The blade adjusting mechanism 3, as shown in FIG. 1 as an example, comprises a rotating member 31 for substantially causing the rotation of the adjustable blades 1 in the assembly and transmitting members 32 for transmitting the rotation to the adjustable blades 1. As shown in FIG. 1, the rotating member 31 is formed to have an approximate disk shape having an opening at the center thereof and provided on a peripheral portion thereof with the same number of transmitting members 32 as that of the adjustable blades 1 spaced at regular intervals. Each transmitting member 32 comprises a driving element 32A rotatably mounted on the rotating member 31 and a driven element 32B fitted fixedly on the reference planes 15 of the adjustable blade 1. In the state where the driving element 32A and the driven element 32B are connected to each other, the rotation is transmitted. More specifically, the driving element 32A having the shape of a rectangular piece is pivotally mounted to the rotating member 31, and the driven element 32B which is formed to be substantially U-shaped to receive the driving element 32A is fixed on the reference planes 15 at the distal end of the adjustable blade 1. The rotating member 31 is attached to the boss portion 24 such that the driving elements 32A having a rectangular piece shape are fitted into the respective U-shaped driven elements 32B, to thereby engage the driving elements 32A and the driven elements 32B with each other.

In the initial state where the plurality of adjustable blades 1 are attached, in order to align them on the circumference, it is necessary that each of the adjustable blades 1 and a respective one of the driven elements 32 B are attached to form a predetermined angle. In the illustrated embodiment, the reference planes 15 of the adjustable blade 1 mainly perform such an alignment function. Furthermore, in the case where the rotating member 31 is simply fitted into the boss portion 24, it is feared that the engagement of the transmitting member 32 will be released when the rotating member 31 slightly moves away from the turbine frame 2. Therefore, in order to prevent this, a ring 33 or the like is provided on the side opposite to the turbine frame 2 such that the rotating member 31 is interposed between the ring 33 and the turbine frame 2, to thereby urge the rotating member 31 toward the turbine frame 2.

By such a structure, when the engine is running at low rotational speeds, the rotating member 31 of the blade adjusting mechanism 3 is rotated as necessary, and the rotation is transmitted to the shaft portions 12 through the transmitting members 32, so that the adjustable blades 1 are rotated as shown in FIG. 1 so as to suitably throttle the exhaust gas G, with the result that the flow rate of the exhaust gas is regulated.

One example of the exhaust gas guide assembly A to which the adjustable blades 1 of the present invention is applied is constructed as mentioned above, and a description will be given below of a method of manufacturing the adjustable blade 1. In the following, a description will be given of the first embodiment in which a blank is punched out from a metal member having an approximately constant thickness and processing such as forming or the like is applied to the blank serving as a starting material (a shaped material W) for the adjustable blade 1, and a second embodiment in which forming or the like is performed by appropriately heating the shaped material W or the like. Further, a description will be given of a third embodiment in which finishing is performed by compressing the shaped material W formed to have a so-called near net shape extremely close to an aimed at shape and size between a pair of opposed dies at the time of finishing a vane height h corresponding to a blade width of the adjustable blade 1.

(1) Embodiment 1

(i) Preparing Step of Shaped Material (Blank)

Figure 4:
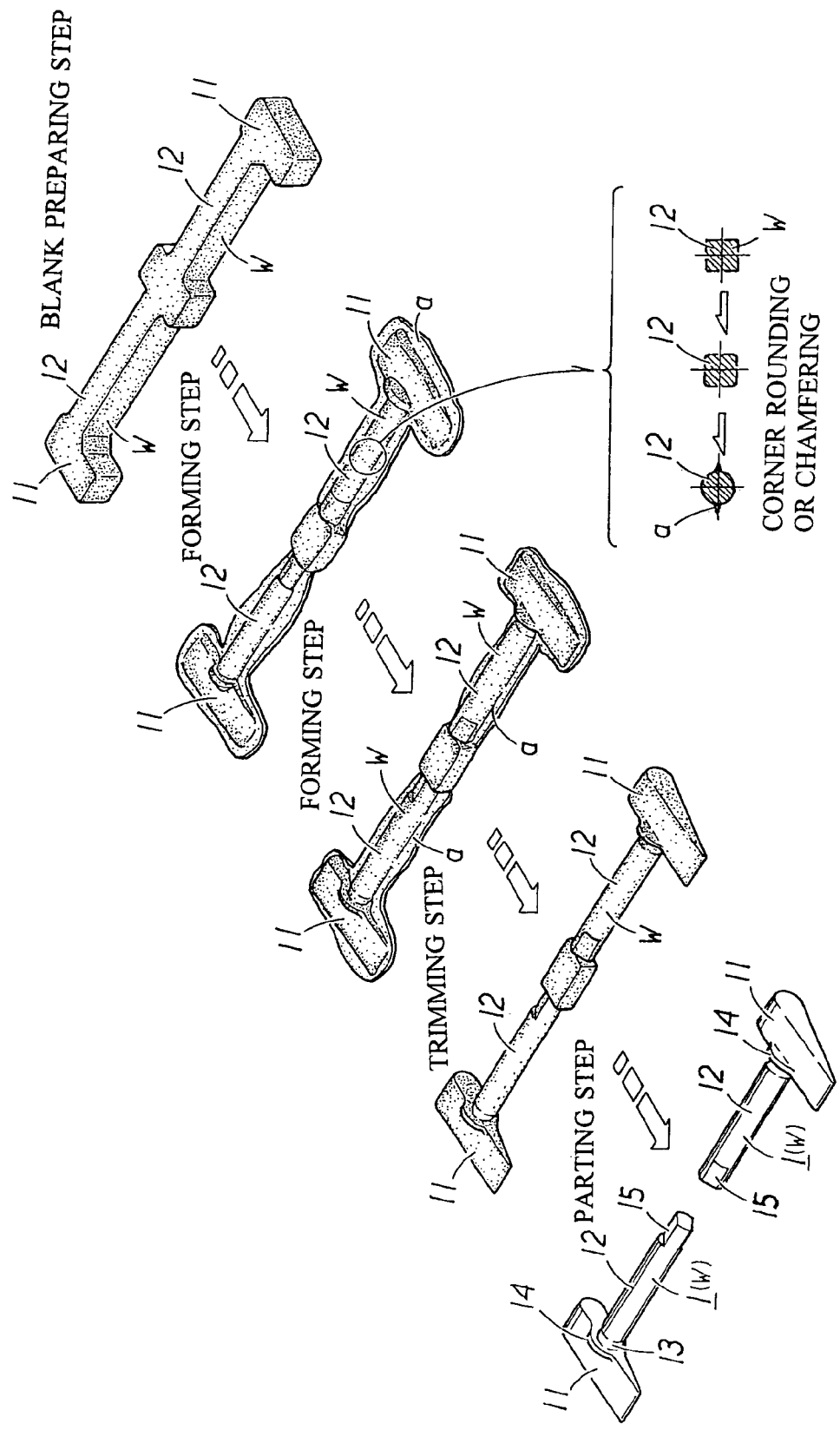
FIG. 4 is a perspective view showing a manner in which the adjustable blade is changed step by step in a shape through various steps.

This step is a step of preparing the metal shaped material W which is integrally provided with the blade portion forming section 11a and the shaft portion forming section 12a, and which is a starting form for the adjustable blade 1. In this embodiment, the shaped material W is constituted by the blank punched out from the metal material having an approximately constant thickness, for example, by fine blanking (which is known as a precise punching method, and is hereinafter abbreviated as FB). Of course, the blank (shaped material W) is punched out so as to have a volume capable of achieving the aimed at adjustable blade 1. In this case, the punching step is preferably constructed so that a plurality of blanks are obtained with one punching operation. For example, in a mode shown in FIG. 4 illustrating a shape of a blank member, the blank member which includes two pieces for the blanks is obtained from band steel having a thickness of about 4 mm. In this case, the blank is punched out so as to produce an approximately 1 shape in a plan view. In FIG. 4, a wide portion in a center of a pair of blanks is formed in connection with the two-piece punching of the blank member, and connects the pair of blanks. In this case, a material of the band steel is a heat resistant material such as SUS310S or the like.

Further, for punching out the shaped material W mentioned above, it is possible to apply, for example, the FB as mentioned above. The FB is a method of punching in a so-called zero-clearance state where a clearance of a tool is made extremely small, while applying a high compression force to a sheared profile portion of a material to be processed (in this case, a plate material from which the shaped material W is punched out), whereby a cut surface is extremely smooth all along the thickness in a good state.

In the preparing step of the shaped material W mentioned above, the description is provided for the step of punching the shaped material W from the metal plate having the approximately constant thickness. However, in the case where a blank such as one available in the market or the like which is previously punched out to have an appropriate shape can be applied, provision of this kind of blank may replace the preparing step of the shaped material W.

(ii) Forming Step

This step is a step of compressing the shaped material W between a pair of opposed dies to form the shaped material W into a desired shape by forging (die forging), coining or the like on a press machine, whereby a curved shape of the blade portion 11 and the shaft portion 12 is formed in the shaped material W. In this connection, forging means mainly forming the shaped material W into an appropriate shape as a whole, and coining means mainly applying an appropriate shape or pattern onto the surface of the shaped material W. In this case, these processing are generically called forming. Further, the forming step is not necessarily finished through the shape application to the shaped material W by one pressing operation, and the shape can be applied step by step several times using a plurality of opposed dies (see FIG. 4).

In this case, a non-product portion a protruding from a product portion is formed in the shaped material W in the forming step mentioned above, however, the non-product portion is later trimmed.

As mentioned above, the forming step is a step of mainly causing the metal raw material on the surface of the shaped material W to flow by compressing the shaped material W between the opposed dies so as to deform the shaped material W into a desired shape. Accordingly, it is preferable to apply rounding (fillet processing) or chamfering to appropriate corner portions of the shaft portion 12 of the punched shaped material W, as shown in FIG. 4 by way of example, to facilitate the flow of the metal material, in a stage after punching out the shaped material W and before the substantial forming mentioned above is performed or an initial stage of the forming step. This is provided for the purpose of preventing a dead metal flow state of the metal material in the corner portions (four corner portions) and facilitating a smooth plastic flow. More specifically, for example, the cross sectional shape of the shaft portion 12 of the shaped material W just after being punched out is an approximately quadrangular shape, however, the final cross sectional shape of the shaft portion 12 is a circular shape (approximately a complete round). Accordingly, the cross section of the shaft portion is formed so as to be close to the circular shape first by applying rounding or chamfering to the corner portions (four corner portions) of the cross section of the shaft portion 12 in the initial stage of the forming step, to thereby facilitate the plastic flow of the metal material. Of course, in the case where it is not necessary to form a round corner in all the corner portions of the shaped material W, it is not necessary to apply rounding or chamfering, for example, to a portion of which the final shape is to be an acute angle.

In this case, the opposed dies used in the forming step are constructed so that a minimum thickness of 0.2 mm can be achieved with respect to the shaped material W by employing technical measurements, such as identifying of a developed shape which keeps the shape of the shaped material W to be processed in a minimum area, increasing of a die rigidity standing against a concentrated load (a hardness, a toughness and the like of a punch, a die and the like), applying a coating process (PVD or the like) for reducing a surface friction to an Mo-based hard metal, and the like. In particular, a distal end portion of the blade portion is thinner in an acute shape as a position on the distal end portion is close to a tip end thereof (a thickness of the tip end is, for example, about 0.3 mm), and the desired shape and size can be realized in the distal end portion mentioned above. In this connection, the distal end portion of the adjustable blade 1 serves as a portion which comes into contact with another adjustable blade 1 or apart from another adjustable blade 1. Since the flow rate of the exhaust gas G is determined particularly by a distance between the adjustable blades 1 at the time of throttling the exhaust gas G, the distal end portion is an important operation portion which is required to have a higher degree of accuracy.

(iii) Trimming Step

This step is a step of cutting the non-product portion that is protruding from the product portion in the forming step mentioned above, wherein, for example, the shaped material W is clamped by a pair of opposed dies and the non-product portion a is trimmed by the FB.

(iv) Parting Step

This step is a step of separating the shaped material W including multi-piece blanks (two pieces in this case) into individual blanks, wherein, for example, the shaped material W is clamped by a pair of opposed dies and a punch acts on the connection portion of the shaped material W so as to cut this portion. In this case, the parting step is required in the case of the multi-piece blank forming in which a plurality of shaped materials W are connected, and the parting step is not performed, for example, in the case that the shaped material W is punched out one by one and is subjected to forming.

Further, it is possible to apply a knuckle joint press machine corresponding to one kind of the cold press forging machine to steps from the forming step to the parting step mentioned above. At this time, it is possible to place the exclusive knuckle joint press machine in each of the steps, and it is possible to use one knuckle joint press machine in common and appropriately change the opposing die every time when each of the steps is performed, thereby forming the shaped material W in the target adjustable blade 1.

In this embodiment, the shaped material W is formed to have a near net shape that is extremely close to the finished product (the adjustable blade 1) in the forming step mentioned above, however, the construction is not always limited to this. The flange portion 14 or the like can be additionally formed, for example, by pressing the shaped material W with the opposed dies after the parting step mentioned above, mainly as a finishing operation.

(v) Rolling Step

Figure 3:
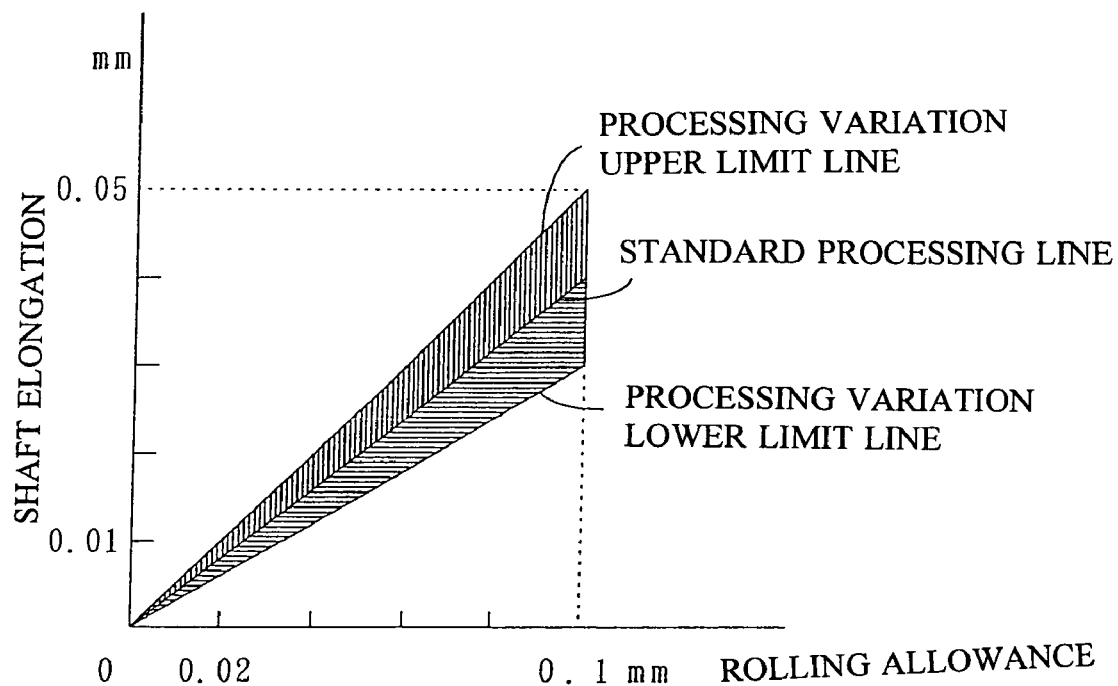
FIG. 3 is a graph showing the relationship between a rolling allowance at the time of rolling a shaft portion of the adjustable blade (the shaped material) and a shaft elongation caused thereby.

This step is a step of pressing the shaft portion 12 of the shaped material W which has approximately an appearance of only the product portion after trimming against a pair of dies so as to form it into a desired diametrical thickness. In this case, a rolling allowance in this embodiment is limited to an extremely small size about 0.05 to 0.1 mm, for example, whereby it is possible to restrict a shaft elongation (a phenomenon that the shaft portion 12 is elongated in an axial direction) caused by rolling, for example, to 0.05 mm or less (an upper limit taking into consideration variations). Of course, the shaft elongation of such a level does not require a cutting operation which has been frequently performed conventionally for correcting the shaft elongation. Accordingly, it is possible to completely eliminate the cutting operation from the manufacturing step of the adjustable blade 1, so that mass production of the adjustable blade 1 can be actually achieved. In this case, the relationship between the rolling allowance and the shaft elongation is shown in FIG. 3, for example. In FIG. 3, a straight line passing through a point at which the shaft elongation is 0.05 mm when the rolling allowance is 0.1 mm is a variation upper limit line, and a range of variations is indicated below the upper limit line by a hatched area including a standard processing line, and is shown (in FIG. 3, upper and lower variation ranges on the basis of the standard processing line are shown by differently hatched).

(vi) Barreling Step

This step is a step of entirely polishing the surface of the shaped material W after finishing the rolling step. The surface of the shaped material W is finished, for example, by rotating or vibrating a barrel having the shaped material W and an additive referred to as media charged therein so as to cause the shaped material W to collide with the media, with the result that the adjustable blade 1 as the finished product is obtained.

(2) Embodiment 2

The second embodiment is substantially the same as the first embodiment in the work itself, however, it is characterized by heating the shaped material W and the like mainly at the time of performing the forming work. Accordingly, a description will be given mainly of this point At the time of the forming work, in this embodiment, either one or both of the raw material (shaped material W) and the opposed dies is heated to 50 to 300° C. in accordance with an $Md_{30}$ value which is a strain induced martensitic transformation index of the shaped material W. Herein, the term "$Md_{30}$", which is typical of austenitic (stainless steel) materials, denotes the temperature at which 50 vol % of an austenitic phase transforms into a ferromagnetic high-strength martensite phase, when uniaxial tensile stress true strain is imparted to a raw austenite plate, and which indicates that the higher the value, the likelier the raw material is to change into martensite. $Md_{30}$ is the value predetermined by the composition and micro grain size of the heat resisting material used as the shaped material W.

Figure 5:
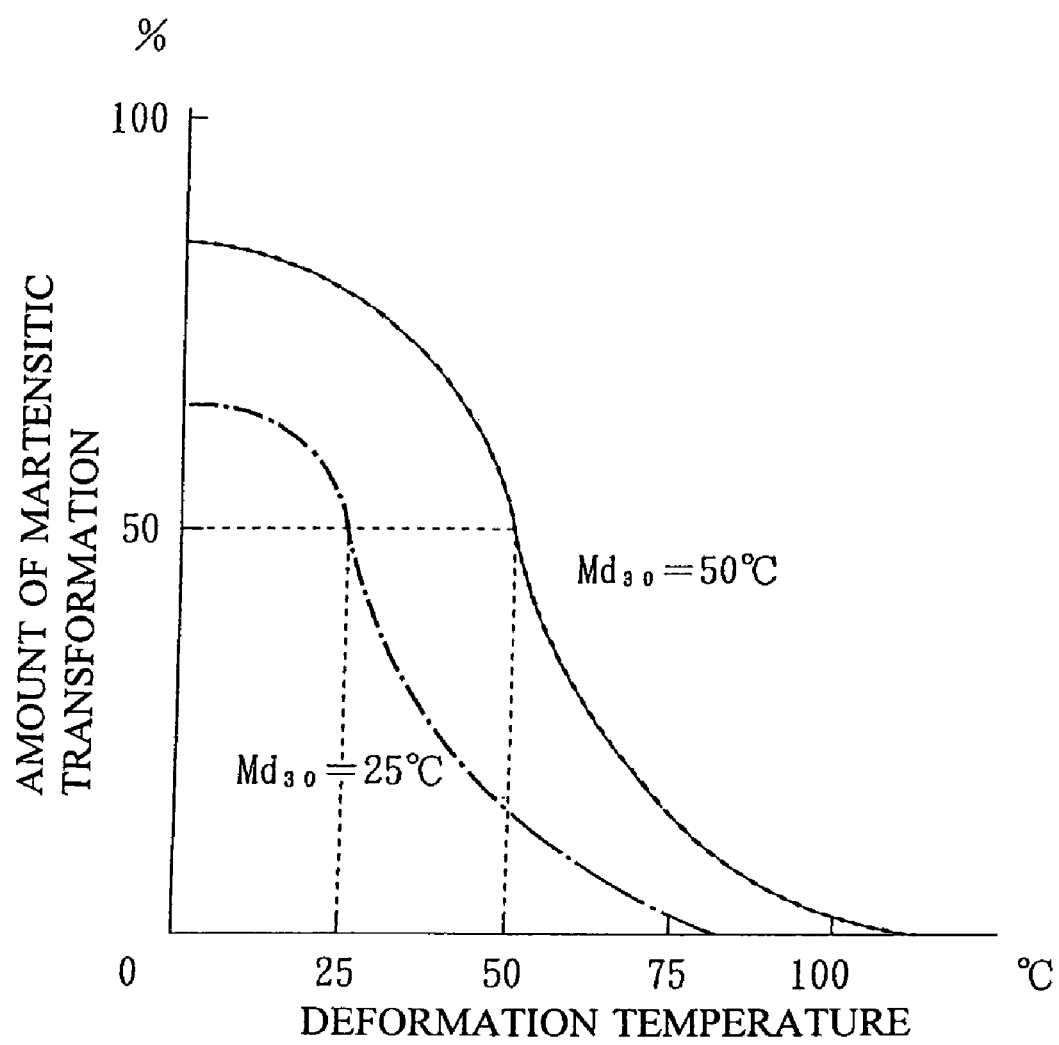
FIG. 5 is a graph showing the relationship between a deforming temperature and an amount of martensitic transformation, in the case that an $Md_{30}$ value is 25° C. and 50° C.

In this case, FIG. 5 shows relationship between a deformation temperature and an amount of martensitic transformation when $Md_{30}=25°$ C. and $Md_{30}=50°$ C. It is apparent from FIG. 5 that to obtain the same amount of martensitic transformation, the higher the $Md_{30}$ value, the higher the deformation temperature must be. For this reason, the higher the $Md_{30}$ value, the higher heating temperature is set for the shaped material W and the opposed dies. For instance, the heating temperature for the shaped material W and the opposed dies is set to be about 150° C. when $Md_{30}$=about 0° C., and to be about 200° C. when $Md_{30}$=about 20° C.

Thus, the shaped material W is processed under proper heating conditions according to the type of material used, to thereby enhance flow of the metal material of the shaped material W, facilitating not only processing in the heated condition but also processing in later stages. That is, a small amount or several vol % or less of martensite is uniformly transformation distributed while being associated with the dislocation density equivalent to that of austenite, with the result that an even plastic deformation is generated at the rolling operation in the next step, to thereby secure a roundness and restrict an axial strain and a sharp edge (an acute portion which is formed at the distal end portion of the shaft portion in a protruding state by the rolling).

Further, at the time of the rolling operation, the rolling property is improved because of the heat applied to the shaped material W and the opposed dies in the forming step, for example, the shaft portion 12 is finished with an accuracy having a roundness within ±10 μm. As mentioned above, in this embodiment, since the forming operation is performed while the shaped material W and the opposed dies are set at the warm temperature in correspondence to the $Md_{30}$ value of the material kind, the even plastic flow is generated in the metal raw material, to thereby make the flow of the material slow, with the result that the sharp edge is hard to generate in the shaft portion 12 at the time of the rolling.

In this case, the punching step of the shaped material W (the blank) is, prior to the forming, performed, for example, under a room temperature atmosphere, however, the punching step is performed while the metal plate material (the shaped material W) and the punching apparatus (the die) are appropriately heated as required. In this connection, in the case where the punching is performed under the room temperature atmosphere, it is possible to reduce the cost required for the punching work. In particular, in this embodiment, since the shaped material W and the opposed dies are heated to a warm condition in the forming step, unnecessity of heating in the preparing step of the shaped material W prior to the forming step contributes to achieving mass production.

Further, in this embodiment, the shaped material W and the dies are heated mainly at the time of the forming, however, it is not necessary to always set to an averaged fixed temperature state, and it is possible to heat so as to have an appropriate temperature gradient. Further, at the time of the processing, it is possible to efficiently perform the forming by appropriately regulating the processing speed in addition to the temperature control.

(3) Embodiment 3

(i) Preparing Step of Shaped Material

This step is a step of preparing the metal shaped material W serving as a starting form for the adjustable blade 1 in a similar manner to that in the first and second embodiments mentioned above. To form the shaped material W, it is possible to apply an appropriate technique such as precision casting, metal injection molding, punching out of a blank or the like, and a description will be given in summary of each of the techniques.

(a) Precision Casting

For example, a lost wax method representing the precision casting is a method of reproducing an aimed at product (the adjustable blade 1 in this case) approximately faithfully in both of a shape and a size by a wax model, coating a periphery of the wax model with a refractory material, thereafter melting the wax portion therein so as to obtain only the refractory material (the coating material), and casting by using this as a casting mold. As mentioned above, in accordance with the precision casting, it is possible to reproduce the cast product (the shaped material W) with a high degree of accuracy by approximately faithfully forming the casting mold in correspondence to the aimed at product. However, in this embodiment, a virgin material having a heat resistant steel (alloy) as a main base material is used at the time of the casting, and amounts of C (carbon), Si (silicon) and O (oxygen) contained therein are set to be proper, for example, set to be, by weight %, 0.05 to 0.5% of C, 0.5 to 1.5% of Si and 0.01 to 0.1% of O, to thereby improve the fluidity of a molten metal, so that a dimensional accuracy of the cast product is further improved, with the result that the shaped material W can be formed to have a more near net shape. Further, it is possible to appropriately employ a technical measurement, in which the metal material together with the casting mold are rapidly cooled, for example, after pouring the molten metal, so that the time required until the mold is broken is shortened so as to make solidified grains of the shaped material W fine, resulting in the sharp edge being hardly generated in the later rolling operation.

(b) Metal Injection Molding

This method is a method in which metal powder as a material and a binder (an additive for coupling mainly metal powder particles such as, a mixture of polyethylene resin, wax and phthalic acid ester) are kneaded so as to impart plasticity to the metal powder; then, the material is injected into a metal mold and formed into a desired shape; and thereafter, the binder is removed, followed by sintering. In accordance with this method, the molded product (the shaped material W) having a near net shape can be obtained in the same manner as the precision casting. At this time, in order to generate closed cells (spheroidal spaces between metal particles) as fine and uniformly as possible, sintering is carried out for about 30 minutes to 2 hours. Alternatively, the molded product is subjected to a HIP (Hot Isostatic Pressing) treatment, whereby the bulk density of the molded product is enhanced. Further, a technical measurement may be applied which makes the metal powder sphere-shaped and fine by an air atomizing process, a water atomizing process or the like so as to improve fatigue characteristics of the shaped material W under high-temperature rotatory bending.

(c) Blanking a Blank

This technique is a technique in which a blank is blanked or punched out from a band steel or the like having a substantially constant thickness, for example, about 4 mm in such a manner as to have a volume (a volume of the metal material) capable of achieving the aimed at adjustable blade 1 and which serves as a starting material (a shaped material W). Of course, in the blanking process, since a punching direction is straight, it is impossible to form, for example, the shaft portion forming section 12a to have an approximately circular shape in cross section only by the blanking step, and thus the shaft portion forming section 12a of the blanked blank is generally formed to have an approximately rectangular shape in cross section. Accordingly, before the processing progresses to the rolling step after the punching step, the shaft portion forming section 12a is formed to have an approximately circular cross section by applying a forming process such as forging, coining or the like to the shaft portion forming section 12a having, for example, an approximately rectangular cross section. In other words, substantially, the shaped material W having a near net shape of the same level as that by precision casting, metal injection molding or the like, is obtained through the blanking step and the forming step. Accordingly, the reference surface 15 or the like, at the distal end of the shaft portion 12, is formed in this forming stage.

In the case of changing the cross sectional shape of the shaft portion forming section 12a in the forming step, a technical design of rounding (fillet processing) or chamfering corners of the shaft portion forming section 12a having the quadrangular cross sectional shape or the like so as to make the shape thereof close to a completed shape such as a circular shape or the like. Accordingly, it is possible to prevent a dead metal flow state of the metal material, so that a smooth plastic flow of the metal material can be promoted in the substantial forming step. In this connection, in the forming step, the blade portion 11 can be concurrently formed to have a desired shape (a near net shape).

Further, in this embodiment, in view of finishing the vane height h by pressing with a pair of opposed dies, in order to efficiently and accurately perform all of the processing steps, it is desirable to employ blanking on a press so as to obtain the shaped material W.

(ii) Processing Shaft Portion

When the shaped material W is formed to have a near net shape by the appropriate method as mentioned above, the shaft portion forming section 12a of the shaped material W is processed to have a desired diametrical thickness at this time. For example, a rolling apparatus is used for this, wherein the shaft portion forming section 12a is pressed by a pair of dies, and a substantial form rolling is applied while the shaped material W and the dies are relatively rotated. In this case, the shaft portion forming section 12a is processed to produce the desired diametrical size by the rolling because of taking into consideration mass productivity of the adjustable blade 1. However, in the case of the number of products being small or large item small scale production, or in the case that the sharp edge tends to be generated in the rolling, the shaft portion 12 may be processed by the cutting operation.

In this case, when the shaped material W having a near net shape close to the finished product in the nature (quality), the size and the like is obtained by the precision casting method, the metal injection molding method or the like mentioned above so that for example, the rolling or the like is not required, it is possible to eliminate the processing step of the shaft portion mentioned above.

(iii) Press Working of Blade Portion

After processing the shaft portion forming section 12a approximately to have the desired diametrical size, the shaped material W having a near net shape is compressed between a pair of opposed dies, so that the shape, the size and the like of the blade portion such as the blade height h or the like is finished with a desired accuracy. In this case, the blade height h of the shaped material W subjected to the press finishing mentioned above is formed in a range of accuracy between +0.05 and +0.15 mm based on the completed state, this is finished with a tolerance of ±0.01 on the basis of an aimed at size by the press working, whereby the adjustable blade 1 in the completed state is obtained. In order to achieve the blade height h having the desired accuracy by pressing the blade portion forming section 11a of the shaped material W as mentioned above, it is necessary to form the shaped material W having a near net shape extremely close to the aimed at adjustable blade 1. On the contrary, it is hardly possible to achieve the blade height h having the desired accuracy even by the press working on the shaped material W which is apart from the aimed at adjustable blade 1, and in most cases, the blade portion 11 and the shaft portion 12 are accidentally bent or the mounting state of the blade portion 11 and the shaft portion 12 becomes out of order.

Figure 6:
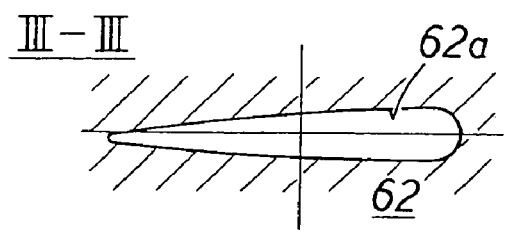
FIG. 6 is a cross sectional view showing opposed dies which compress the shaped material to finish a vane height of the adjustable blade with a desired accuracy.
Figure 6:
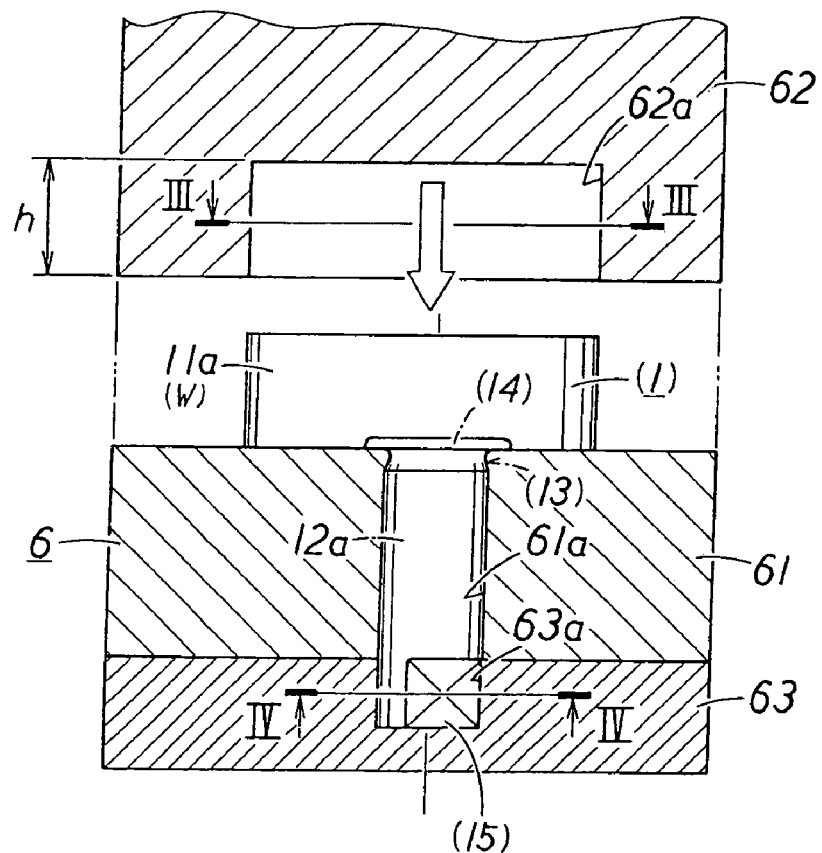
Figure 6:
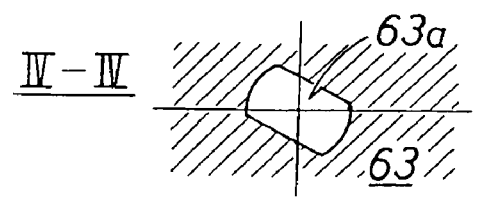

As a pressing device for finishing the blade portion 11 of the shaped material W, a pair of opposed dies 6 are used, for example, as shown in FIG. 6. The pressing device is provided with a holding die 61 for holding the adjustable blade in an immobile state, and a pressing die 62 relatively moving in close to and apart from the holding die 61. Further, a shaft portion receiving portion 61a for receiving the shaft portion 12 (the shaft portion forming section 12a) is engraved in the holding die 61 in order to hold the adjustable blade 1, and a blade portion receiving portion 62a for receiving the blade portion 11 (the blade portion forming section 11a) is engraved in the pressing die 62, whereby the shaped material W is compressed from a direction of the blade width by the holding die 61 and the pressing die 62 so as to finish the vane height h. Since the finishing press presses in a state in which the periphery of the adjustable blade 1 is surrounded by the opposed dies 6, as mentioned above, it is possible to substantially completely prevent the blade portion 11, the shaft portion 12 and the like from being accidentally bent or deformed.

In this case, for press finishing the vane height h mentioned above, maintaining the mounting state between the blade portion 11 and the shaft portion 12 approximately in a fixed state leads to securing the stable rotating of the adjustable blade 1, and leads to an improvement of the performance of the exhaust gas guide assembly A by extension. Accordingly, in this embodiment, a cam die 63 for holding the reference surface 15 is further provided on a bottom side of a receiving portion (a lower side in FIG. 6) of the holding die 61 for receiving the shaft portion 12. That is, the press finishing is applied to the shaped material W in a state where the shaped material W is held in an approximately fixed attitude by inserting the reference surface 15 into a reference surface receiving portion 63a formed in the cam die 63. Accordingly, it is possible to apply the press finishing while the mounting state between the blade portion 11 and the shaft portion 12 is maintained, that is, the inclined state between the blade portion 11 and the reference surface 15 is kept in an approximately fixed state, to thereby achieve a high degree of accuracy in the mounting position between the blade portion 11 and the shaft portion 12 and restrict the variations therein as much as possible.

As mentioned above, the finish pressing of the shaped material W is performed in a state where the shaped material W (the adjustable blade 1) is regulated in the appropriate attitude by inserting the reference surface 15 in the cam die 63 and holding the shaft portion 12 by the holding die 61. Accordingly, the press working functions to somewhat correct the mounting state of the blade portion 11 on the basis of the shaft portion 12, so that it is possible to expect a reforming effect obtained by the press working per se.

In this case, as mentioned above, the shaped material W is appropriately finished by the finish pressing not only in the vane height h but also in the shape of the surface of the blade portion 11.

Further, in the embodiment shown in FIG. 6, the operating direction (the separating direction) of the opposed dies 6 is set to be approximately vertical, the holding die 61 is arranged on the lower side and the pressing die 62 is arranged on the upper side, however, the die parting direction or the arrangement of the holding die 61 and the pressing die 62 is not always limited to this.

Further, the description is given of the embodiment in which the blade portion 11 is finish pressed after the shaft portion 12 is processed to have the desired diametrical size, however, it is not necessary to always process in accordance with this order, and the shaft portion 12 may be processed after finish pressing the blade portion 11.

(iv) Barreling Process

This step is a step of entirely polishing the surface of the shaped material W after finishing the pressing step. The surface of the shaped material W is finished, for example, by rotating or vibrating a barrel having the shaped material W and an additive referred to as media charged therein so as to cause the shaped material W to collide with the media, with the result that the adjustable blade 1 as the finished product is obtained. In this case, burrs (burrs particularly formed between the mating surfaces of the pair of opposed dies 6 in the pressing step) in the shaped material W can be effectively removed by the barrel process.

A description will be given below of effects of the present invention. First, in the adjustable blade 1 can be manufactured while hardly using the cutting operation, the welding operation or the like which has conventionally required a lot of time for processing, so that it is possible to stably supply the adjustable blades 1 as mass-produced articles to the market.

Further, the shaped material W punched out with a high accuracy by the FB operation is formed into a desired shape by the cold press forging, so that it is possible to smoothly and efficiently perform the punching operation to the forming operation.

Further, it is possible to actually achieve a mass production system having an improved forming property and rolling property while the cutting operation and the welding operation are eliminated as much as possible at the time of manufacturing the adjustable blade 1. More specifically, it is possible to stably supply about 15000 to 20000 adjustable blades 1 to the market per day.

Further, the forming operation is applied to the shaped material W in a state where the shaped material W is set in a proper temperature condition in correspondence to the strain induced martensitic transformation amount of the used raw material, so that it is possible to obtain the accurate adjustable blade 1 which faithfully achieves the aimed at shape and size.

Further, the blank is punched out under the room temperature atmosphere and does not require any specific heating, so that it is possible to reduce the cost required for the preparing step of the shaped material W. Further, in the punched-out shaped material W, for example, the shaft portion 12 is formed to have a quadrangular cross sectional shape, however, since rounding (fillet processing) or chamfering is applied to the corner portions of the cross section, the cross section is close to the circular shape, so that the thereafter forming operation can be smoothly performed. In addition, it is possible to reduce the load of the die and the shaped material W in the forming operation.

Further, it is possible to finish the vane height h of the shaped material W formed to have a near net shape without requiring any cutting operation. Accordingly, it is possible to contribute to a cutting-free process in which the cutting operation is eliminated as much as possible from the manufacturing step of the adjustable blade 1, resulting in mass production of the adjustable blade 1 being more actually achieved.

Further, the adjustable blade 1 is pressed in a state where the periphery of the adjustable blade 1 is surrounded by the opposed dies 6, that is, the shaft portion 12 is surrounded by the holding die 61 and the blade portion 11 is surrounded by the holding die 61 and the pressing die 62, so that it is possible to approximately completely prevent the blade portion 11 and the shaft portion 12 from being accidentally bent or deformed. In particular, since the distal end portion of the blade portion 11 is thin, the blade portion 11 generally tends to deform, however, this deformation is restricted as much as possible. Accordingly, it is possible to obtain the adjustable blade 1 which can achieve a high dimensional accuracy in every portion including the vane height h.

Further, the press working can be performed on the basis of the shaft portion 12 (the reference surface 15) by the cam die 63, so that the adjustable blade 1 having a high degree of accuracy can be obtained in view of the mounting angle between the shaft portion 12 and the blade portion 11 and the vane height h.

Further, it is possible to manufacture the adjustable blade mainly in accordance with the press working, to thereby eliminate a lot of cutting operations from the manufacturing step. Accordingly, it is possible to more actually achieve mass production of the adjustable blade.

Further, it is possible to actually achieve mass production of the exhaust gas guide assembly A and the VGS turbocharger which has an excellent heat resistance and a high accuracy. Further, it is possible to accurately and securely regulate the flow rate of the exhaust gas G under the high temperature and exhaust gas atmosphere.

INDUSTRIAL APPLICABILITY

As mentioned above, the present invention is suited to the case where the adjustable blade which always has a stable high quality level and the VGS turbocharger or the like having the adjustable blades incorporated therein are actually mass produced by using the cutting operation and the welding operation as little as possible.

The invention claimed is:

1. A method of manufacturing an adjustable blade for a VGS turbocharger,
   the adjustable blade including a shaft portion serving as a center of rotation and a blade portion for substantially adjusting the flow rate of exhaust gas, the adjustable blade being incorporated in the VGS turbocharger,
   wherein the exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, and thereby a high output power of the engine is obtained at low rotational speeds:
   the method of manufacturing the adjustable blade comprising:
   a shaped material preparing step of forming a blank which is punched out from a metal material having a substantially constant thickness so as to have a volume capable of achieving the aimed at adjustable blade and which is a shaped material providing a starting form for the adjustable blade;
   a forming step of compressing the shaped material between a pair of opposed dies so as to form the blade portion, and the shaft portion;
   a trimming step of trimming a non-product portion of the shaped material protruding from a product portion that is formed in the forming step;
   a rolling step of pressing the shaft portion of the shaped material substantially including only the product portion against a pair of dies after finishing the trimming step so as to have a desired diametrical thickness; and
   a barreling step of surface polishing collectively the shaft portion, and the blade portion of the shaped material.

2. A method of manufacturing an adjustable blade for a VGS turbocharger as claimed in claim 1,
wherein, in the shaped material preparing step, the blank is punched out by fine blanking, and in the forming step, the shaped material is formed to have a desired shape by a cold press forging machine.

3. A method of manufacturing an adjustable blade for a VGS turbocharger as claimed in claim 2,
   wherein in the forming step, processing is performed in a state where one or both of the shaped material and the opposed dies are heated to 50 to 300° C.

4. A method of manufacturing an adjustable blade for a VGS turbocharger as claimed in claim 2,
   wherein the shaped material preparing step is performed by fine blanking under a room temperature atmosphere, and rounding or chamfering is applied to corner portions of the punched blank so as to easily form the blade portion and the shaft portion in the forming step.

5. A method of manufacturing an adjustable blade for a VGS turbocharger as claimed in claim 1,
wherein, in the forming step, processing is performed in a state where one or both of the shaped material and the opposed dies are heated to 50 to 300° C.

6. A method of manufacturing an adjustable blade for a VGS turbocharger as claimed in claim 5,
   wherein an austenitic heat resisting material is applied to the shaped material, and the greater $Md_{30}$ corresponding to a strain induced martensitic transformation index of the shaped material is, the higher a temperature to which the shaped material or the opposed dies is heated in the forming step is set.

7. A method of manufacturing an adjustable blade for a VGS turbocharger as claimed in claim 5,
   wherein the shaped material preparing step is performed by fine blanking under a room temperature atmosphere, and rounding or chamfering is applied to corner portions of the punched blank so as to form the blade portion and the shaft portion in the forming step.

8. A method of manufacturing an adjustable blade for a VGS turbocharger as claimed in claim 6,
   wherein the shaped material preparing step is performed by fine blanking under a room temperature atmosphere, and rounding or chamfering is applied to corner portions of the punched blank so as to form the blade portion and the shaft portion in the forming step.

9. A method of manufacturing an adjustable blade for a VGS turbocharger as claimed in claim 1,
wherein the shaped material preparing step is performed by fine blanking under a room temperature atmosphere, and rounding or chamfering is applied to corner portions of the punched blank so as to form the blade portion and the shaft portion in the forming step.

10. A method of manufacturing an adjustable blade for a VGS turbocharger,
    the adjustable blade including a shaft portion serving as a center of rotation and a blade portion for substantially adjusting the flow rate of exhaust gas, the adjustable blade being incorporated in the VGS turbocharger,
    wherein the exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, and thereby a high output power of the engine is obtained at low rotational speeds, wherein:
    in manufacturing the adjustable blade (1), the adjustable blade (1) is integrally provided with the blade portion (11) and the shaft portion (12) and a starting material thereof is a metal shaped material providing starting form for the adjustable blade;
    the shaped material is made to have such a near net shape by applying a processing operation to the shaped material or the shaped material is originally formed to have such a near net shape in a stage of obtaining the shaped material that the shape and dimensions thereof are made close to those of the aimed at adjustable blade; and
    in finishing a vane height corresponding to a blade width of the adjustable blade, the shaped material having the near net shape is pressed between a pair of opposed dies, and thereby an accuracy of the vane height in a finished state is achieved.

11. A method of manufacturing an adjustable blade for a VGS turbocharger as claimed in claim 10, wherein:
    the pair of opposed dies for finishing the vane height of the adjustable blade includes a holding die for holding the shaped material and a pressing die for relatively moving in close to and apart from the holding die;

a shaft portion receiving portion is formed in the holding die, and a blade portion receiving portion is formed in the pressing die; and at the time of pressing, the blade portion of the shaped material is compressed between the holding die and the pressing die, so that the vane height is finished with a desired accuracy.

12. A method of manufacturing an adjustable blade for a VGS turbocharger as claimed in claim 11, wherein:

the adjustable blade is provided at a distal end of the shaft portion thereof with a reference surface formed in an appropriate inclined state with respect to the blade portion thereof;

the opposed dies are provided with a cam die for receiving the reference surface and positioning the shaped material; and press finishing of the vane height is performed while the adjustable blade is restricted to an appropriate attitude by the cam die.

13. A method of manufacturing an adjustable blade for a VGS turbocharger as claimed in claim 10, wherein:

the adjustable blade is provided at a distal end of the shaft portion thereof with a reference surface formed in an appropriate inclined state with respect to the blade portion thereof;

the opposed dies are provided with a cam die for receiving the reference surface and positioning the shaped material; and press finishing of the vane height is performed while the adjustable blade is restricted to an appropriate attitude by the cam die.

14. A method of manufacturing an adjustable blade for a VGS turbocharger, the adjustable blade including a shaft portion serving as a center of rotation and a blade portion for substantially adjusting the flow rate of exhaust gas, the adjustable blade being incorporated in the VGS turbocharger, wherein the exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, and thereby a high output power of the engine is obtained at low rotational speeds, the method of manufacturing the adjustable blade (1) comprising:

using a blank punched out from a metal material having a substantially constant thickness as a shaped material which provides a starting form for the adjustable blade;

thereafter, compressing the shaped material between a pair of opposed dies so as to form the blade portion, and the shaft portion to have desired shapes;

then trimming a non-product portion of the shaped material protruding from a product portion of the shaped material;

thereafter, pressing the shaft portion of the shaped material against a pair of dies so that the shaft portion is rolled to have a desired diametrical thickness and a near net shape having a shape and dimensions thereof which are made close to those of the aimed at adjustable blade; and finishing a vane height, which corresponds to a blade width of the adjustable blade, by pressing the shaped material having the near net shape between a pair of opposed dies so as to achieve an accuracy of the vane height in a completed state.

\* \* \* \* \*